United States Patent [19]

Schomblond

[11] Patent Number: 4,708,614

[45] Date of Patent: Nov. 24, 1987

[54] INJECTION MOLDS FOR THE MANUFACTURE OF COMPOSITE BODIES

[75] Inventor: Jacques Schomblond, Montagnieu, France

[73] Assignee: Cartier Industrie, Thyez, France

[21] Appl. No.: 841,967

[22] Filed: Mar. 20, 1986

[30] Foreign Application Priority Data

Mar. 22, 1985 [FR] France ............................... 85 04518

[51] Int. Cl.⁴ ...................... B29C 39/12; B29C 45/16; B29C 45/22; B29C 45/32
[52] U.S. Cl. .................................... 425/120; 425/127; 425/126 R; 425/129 R; 425/572; 425/577; 425/588; 425/414; 425/416; 249/83; 249/122; 249/176; 249/180
[58] Field of Search ............... 425/543, 547, 552, 574, 425/575, 577, 572, 150, 120, 127, 129 R, 130, 542, 257, 588, 126 R, 414, 416; 249/122, 83, 176, 180; 264/245-247, 255, 294, 267, 250

[56] References Cited

U.S. PATENT DOCUMENTS

| | | | |
|---|---|---|---|
| 2,454,508 | 11/1948 | Herrick et al. | 264/255 |
| 3,255,278 | 6/1966 | Smith | 425/127 |
| 4,004,868 | 1/1977 | Ohdate | 425/120 |
| 4,525,134 | 6/1985 | McHenry et al. | 425/130 |

Primary Examiner—Willard E. Hoag
Attorney, Agent, or Firm—Dowell & Dowell

[57] ABSTRACT

An apparatus for molding three concentric plastic materials into a composite body in which the mold includes a pair of molding blocks having reduced ends which define an inner cylindrical cavity into which a first material may be injected, a pair of tubular molding sleeves surrounding the molding blocks and axially movable relative thereto which define an intermediate cavity therebetween into which a second material may be selectively injected to form a second intermediate concentric portion of a composite body and a fixed molding cavity with which the inner and intermediate molding cavities are selectively aligned so that a third material may be selectively injected to form an outer concentric portion of the composite body.

11 Claims, 3 Drawing Figures

INJECTION MOLDS FOR THE MANUFACTURE OF COMPOSITE BODIES

BACKGROUND OF THE INVENTION

Field of the Invention

This invention concerns improvements to injection molds intended for the production of composite bodies such as wheels for vehicles or components made of several different materials.

HISTORY OF THE ART

The injection molding process disclosed in French additional certificate No. 2 425 317 is well known, and the mold involved is also described. This mold is fitted with cross blades which form the side walls of several cavities in alignment with each other and in which materials of different colors are injected. After completion of the injection phase, the blades are moved transversally so that a remaining empty cavity can be filled by a new injection with the side walls formed by the already molded elements.

It can be easily understood that when the parts to be produced are rather thick, the blades deflect under the injection pressure, so that it is not practical to move them again. In such conditions, the mold described in said document cannot be used for the production of thick parts in several colors and/or materials.

We also know, as per document FR No. 2 462 261, a mold that can be used for the injection of thick composite parts using an injection ram that comes and rests against the bottom of a cavity in order to form the side walls of two chambers in which materials of different colors and/or qualities are injected, either simultaneously or successively. The ram is then displaced so as to obtain, between its end and the bottom of the cavity, a third chamber in which another material is injected. It is easy to understand that the ram cannot be moved with a sufficient degree of accuracy to prevent any offset of the third injection with respect to the first injections. Such an offset is absolutely inacceptable for certain parts, and consequently this type of mold cannot be used in such applications.

We also know so-called "transfer molds" consisting of one ram and several dies, whereby successive injections are made through the ram, while the component under process is progressively transferred from one die to the next one, up to the last injection. It is easy to understand that such equipment is very expensive and that the elements molded in a given die may break when being transferred to the next die.

Finally, we know from Japanese document No. 57-203 531 a mold made of two blocks in each of which a partial cavity is bored. The form of each partial cavity corresponds to that of one of the elements of the component to be produced. The element is obtained by a first injection in one partial cavity, while a sliding part is offset with respect to the middle plane of the cavity intended for the molding of at least one other element and which is situated in a fixed part of the mold. The other element is injected after the sliding part has been returned to a position in which its cavity is level with the other cavity.

SUMMARY OF THE INVENTION

The purpose of the improvements covered by the present invention is to remedy the inconveniences mentioned above, and also to make it possible to realize a mold that better meets the requirements encountered in the molding art.

To this end, the mold realized acording to the invention makes it possible to produce bodies made of concentric elements without any visible joints between the successively molded elements.

The mold according to the invention is characterized in that it contains:

- a first middle core movable by an axial displacement device, one end of the core having a reduced diameter;
- a second core aligned with the first core and in contact therewith by an end having a reduced diameter, the other end interacting with another axial displacement device;
- two tubular sleeves surrounding the first and second cores and maintained in reciprocal contact by shafts extending through the cavity between the two sleeves, each of the sleeves being movably contacted by tubular axial displacement devices;
- and a stationary molding cavity.

BRIEF DESCRIPTION OF THE DRAWINGS

The annexed drawings, given as an example, will help to better understand the invention, its characteristics and the advantages offered.

The FIGS. 1, 2 and 3 illustrate a mold realized according to the invention.

Figure 1:
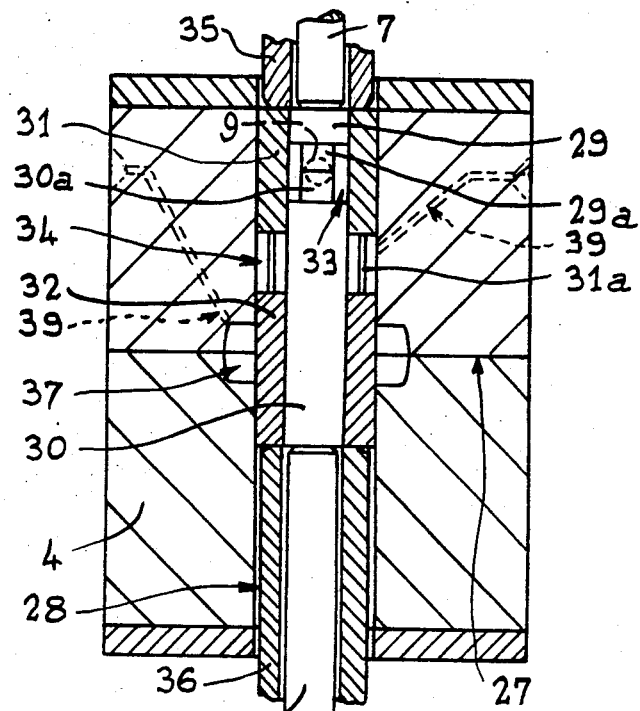
Figure 2:
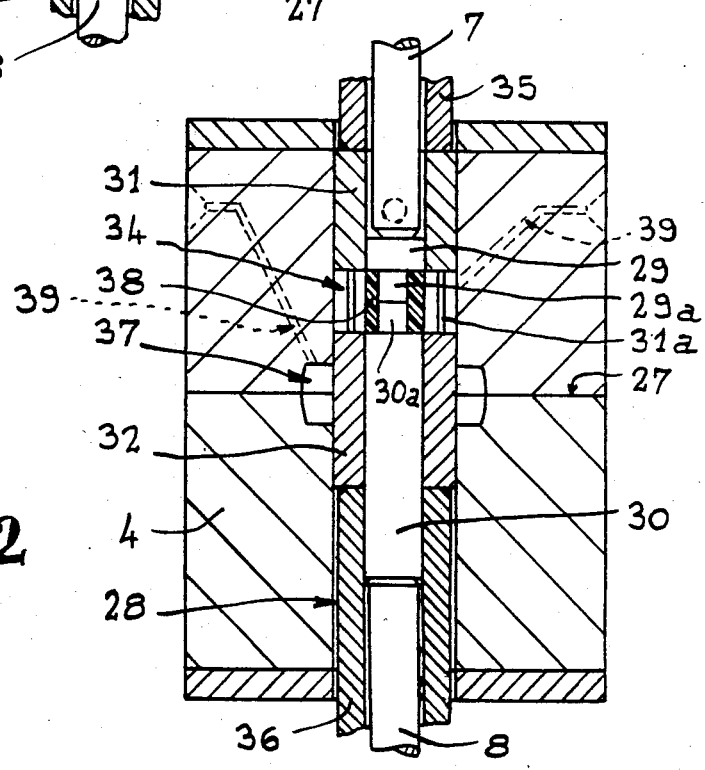
Figure 3:
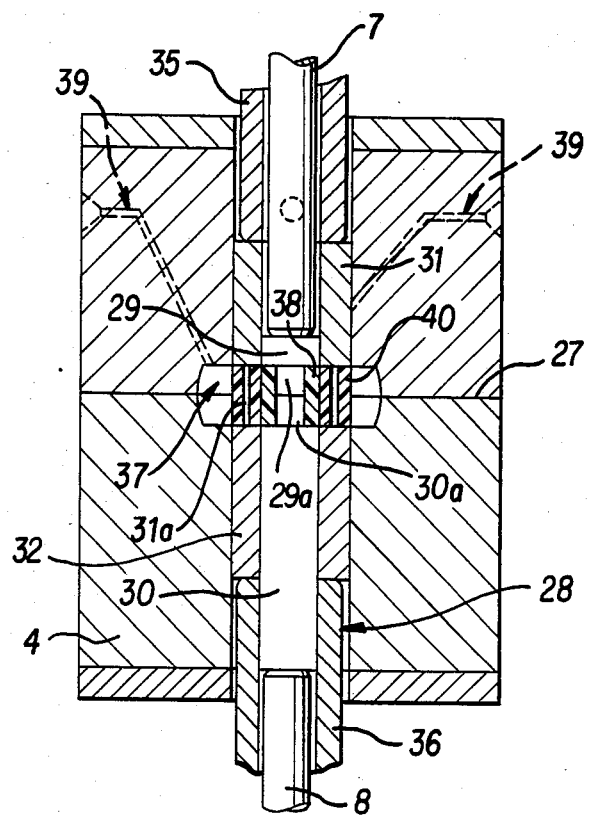

The FIGS. 1 to 3 represent a mold according to the invention, intended for the production of a composite body made of three concentric elements.

DESCRIPTION OF THE PREFERRED EMBODIMENT

The mold under review consists of a fixed part 4 made of two components resting against each other along the contact surface 27.

A boring 28 is cut in the middle of part 4, inside which two cores 29 and 30 are mounted opposite each other; both cores can move axially. Inside the boring 28 are also fitted two tubular sleeves 31 and 32, which rest against each other through the shafts 31a which are integral with the sleeve 31. The free ends of the shafts rest against the opposite face of the sleeve 32.

This embodiment also comprises two pistons 7 and 8 which acts on the cores 29 and 30 to urge them into contact. The ends of the cores are machined so as to have reduced diameter cylindrical necks 29a and 30a which come to rest against each other and create a tubular cavity 33.

In the same way, the space between the opposite ends of the sleeves 31 and 32 forms a cylindrical cavity 34. The sleeves are movably connected by the tubular pistons 35 and 36, which surround the pistons 7 and 8.

It is to be noted that a fixed or stationary chamber is cut in the two components of part 4, along the contact plane 27.

The system operates as follows:

In the first molding phase and according to FIG. 1, the cavity 33 is moved upwards to a position higher than that of cavity 34, which lies higher than the cavity 37. Using the injection nozzle 9, the cavity 33 can be filled so as to obtain a tubular bushing 38 (FIG. 2). The two cores 29 and 30 are then lowered so as to bring bushing 38 level with cavity 34. This way, it is now possible to mold a ring 40 around the bushing 38, by injecting material in the cavity 34 through the feed conduits 39, using an injection nozzle.

All cores and tubular sleeves are then lowered so as to bring the molded composite body flush with the cavity 37. Using a third injection nozzle and the feed conduits 39, the cavity 37 is filled with an appropriate synthetic material to produce an assembly consisting of three concentric elements made of different materials. The composite body produced can be for instance a wheel for any vehicle with the bushing 38 as the hub, the ring 40 as the flange and the outer part as the tread tire.

Thus the mold makes it possible to produce an object such as a wheel consisting of a hub, a flange and a tire, these three elements being molded from materials that can be different in quality and/or color.

I claim:

1. An apparatus for molding composite bodies having at least two concentric sections formed of separated moldable materials comprising a molding block having a bore extending therethrough, a first cavity formed in said molding block so as to be in encircling relationship with said bore, a first injector means for introducing a moldable material into said first cavity, a pair of opposing core members axially aligned within said bore, first means for moving said opposing core members axially within said bore, each of said core members having body portions and end portions, said end portions being of reduced dimension and being in opposing and aligned relationship with respect to one another, a second cavity formed around said end portions of said core members and between said body portions thereof when said end portions are in contacting relationship to one another, second injector means for introducing a moldable material into said second cavity, said second injector means being positioned remotely from said first cavity whereby a first section of the composite body is formed in said second cavity and thereafter said core members are moved so as to align said second cavity having the first section therein with said first cavity and thereafter introducing another moldable material into said first cavity through said first injector means to form a second section of the composite body which is concentric with the first section.

2. The apparatus of claim 1 in which said first means for moving said core members includes opposing first piston means which are axially aligned with said core members.

3. The apparatus of claim 2 including a pair of opposing hollow sleeve means disposed within said bore and in encircling relationship to said opposing core members, a third cavity formed between said sleeve means and in encircling relationship to said core members, second means for moving said sleeve means within said bore and a third injector means for introducing a moldable material into said third cavity when said third cavity is positioned remotely from said first and second cavities, said third injector means being positioned remotely from said first and second injector means.

4. The apparatus of claim 3 in which said second means for moving said sleeve means include opposed generally hollow cylindrical piston means, said cylindrical piston means being slideably received within said bore and encircling said first piston means and said core members.

5. The apparatus of claim 4 including shaft members extending between and abutting each of said sleeve means, said shaft members extending generally parallel with said sleeve means and maintaining said sleeve means in spaced relationship with one another.

6. An apparatus for molding composite bodies having concentrically oriented sections which are formed of separately injected moldable materials comprising, a molding block having a bore extending therethrough, said molding block having opposing sections which define a first mold cavity therebetween, said first mold cavity encircling and being in opened communication with said bore, a first injector means for introducing a first moldable material into said first cavity, a pair of opposing hollow sleeve means slideably disposed within said bore, a second mold cavity formed between said hollow sleeve means, a second injector means for introducing a second moldable material into said second cavity when said second cavity is remote from said first cavity, said second injector means being spaced from said first injector means, a pair of opposing core members slideably disposed within said hollow sleeve means and generally axially of said bore, a third mold cavity formed between said core members, a third injector means for introducing a third moldable material into said third mold cavity when said third mold cavity is remote from said first and second cavities, said third injector means being spaced from said first and second injector means, first means for moving said core members axially within said bore so as to shift said third mold cavity relative to said first and second mold cavities, and second means for moving said sleeve means generally axially within said bore so as to move said second mold cavity relative to said first and third mold cavities.

7. The apparatus of claim 5 in which each of said core members includes inner end portions of reduced cross sectional dimension, said inner end portions normally abutting one another so that said first mold cavity is concentric about said inner end portions.

8. The apparatus of claim 7 including shaft means extending between said sleeve means so as to maintain said sleeve means in spaced relationship from one another.

9. The apparatus of claim 8 in which said first means to move said core members includes first opposing pistons which are receivable within said sleeve means.

10. The apparatus of claim 9 in which said second means to move said sleeve means includes opposing generally tubular piston members which surround said first opposing pistons.

11. The apparatus of claim 9 in which said first, second and third mold cavities are generally annular in configuration.

* * * * *